Patented June 19, 1928.

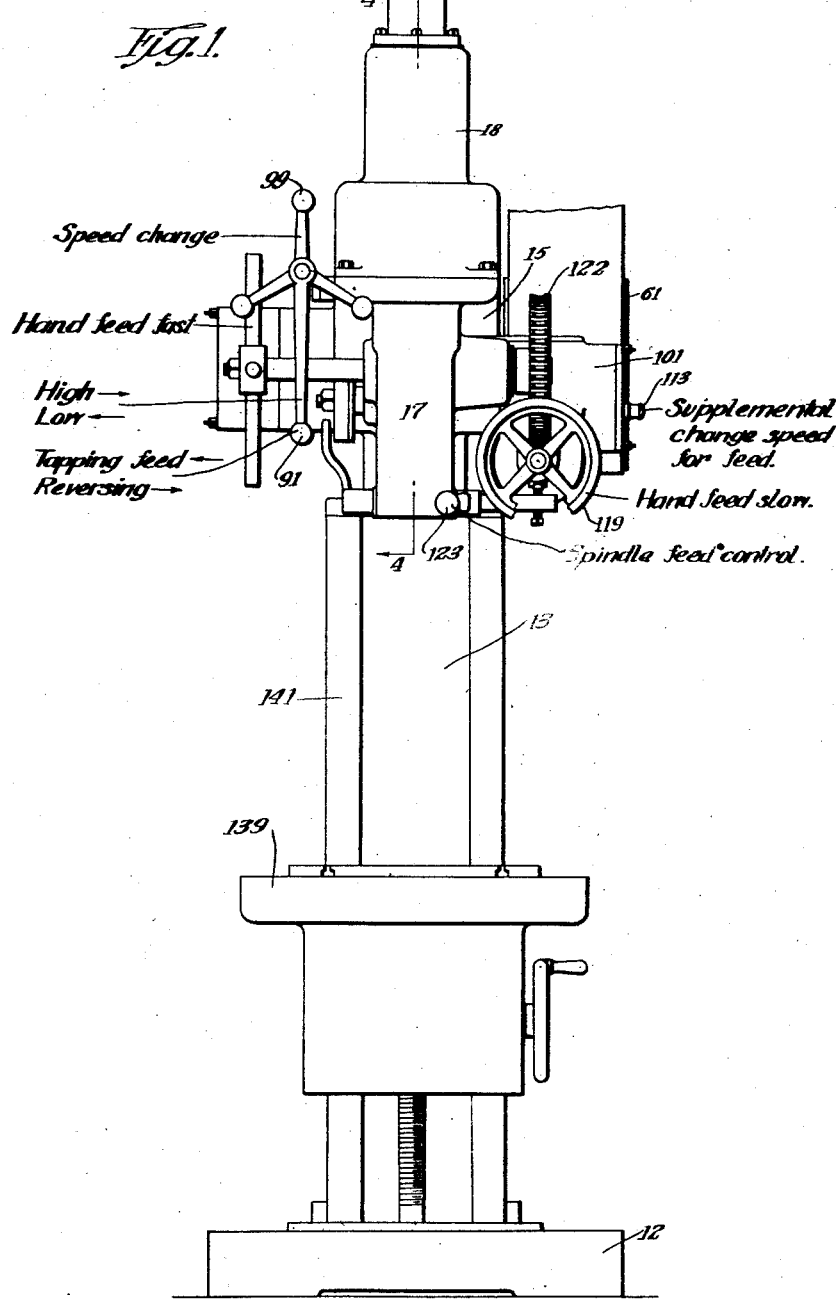

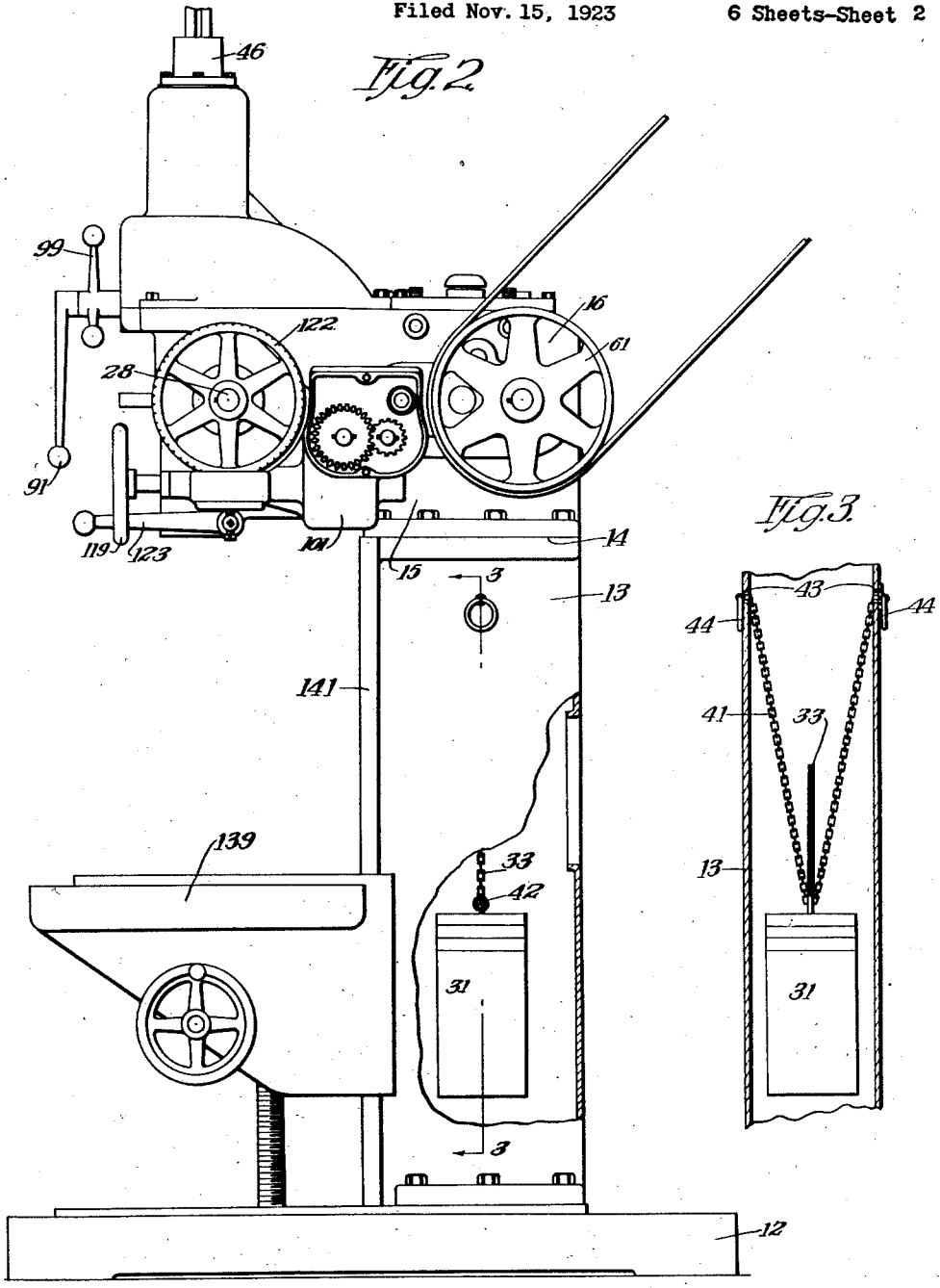

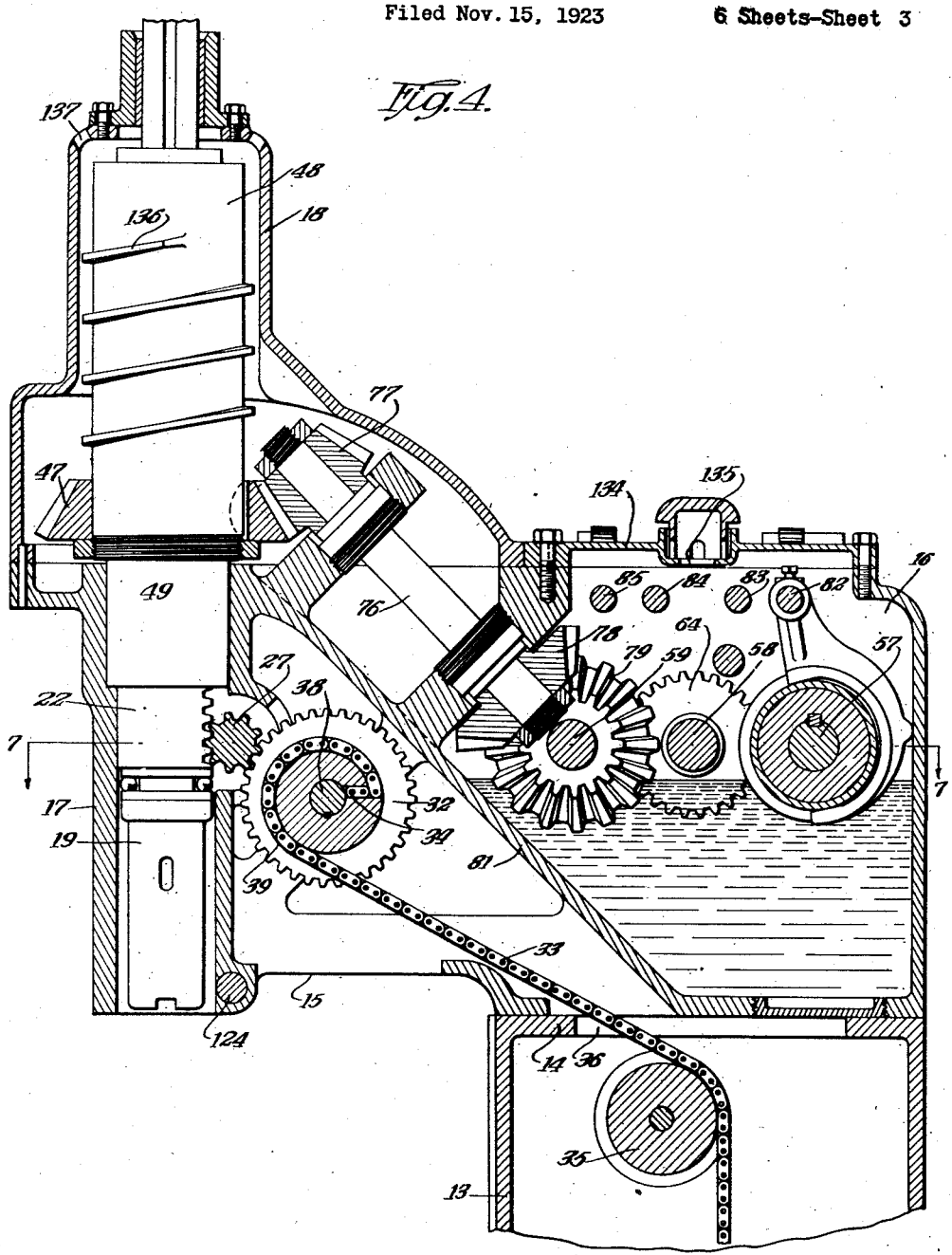

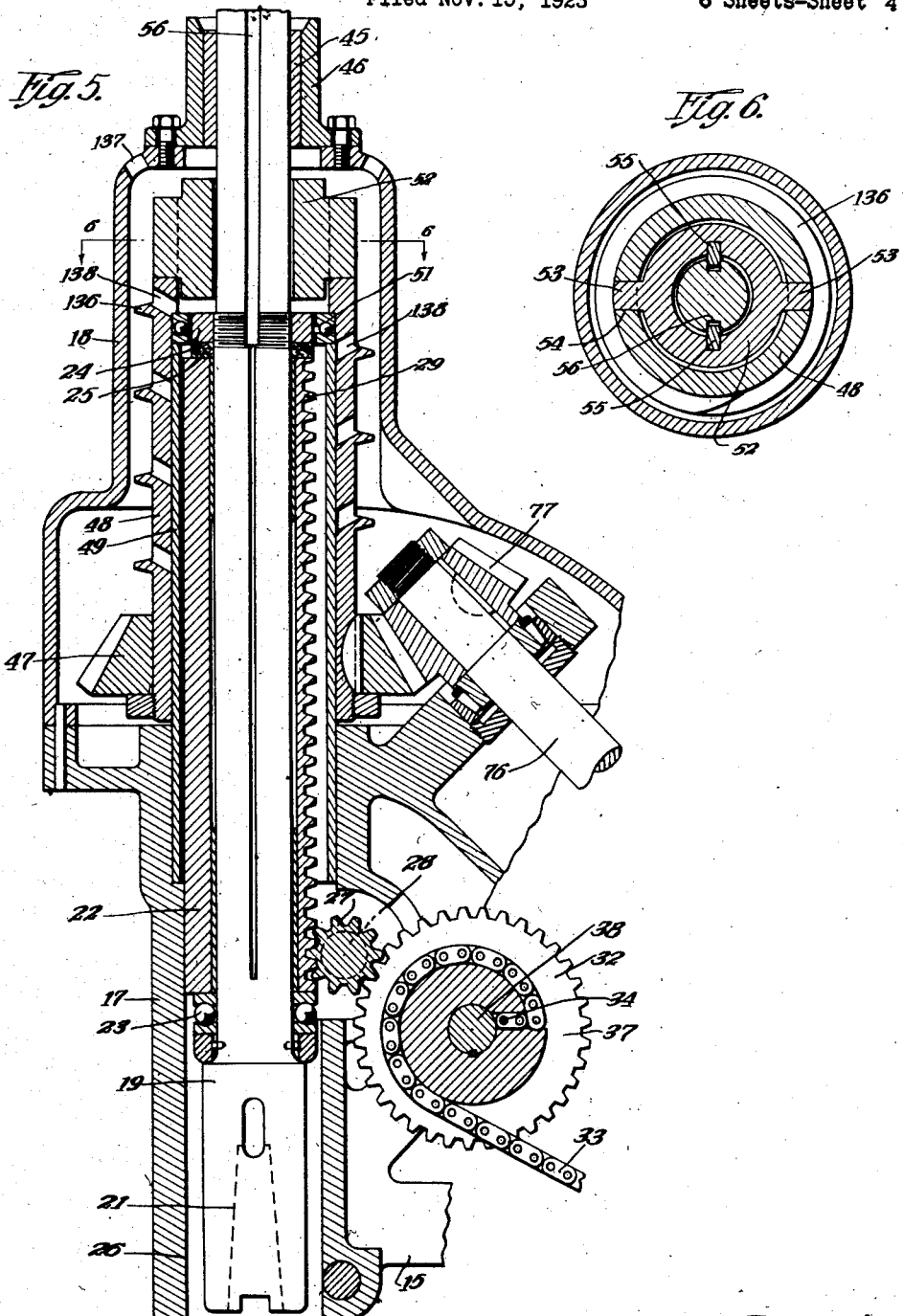

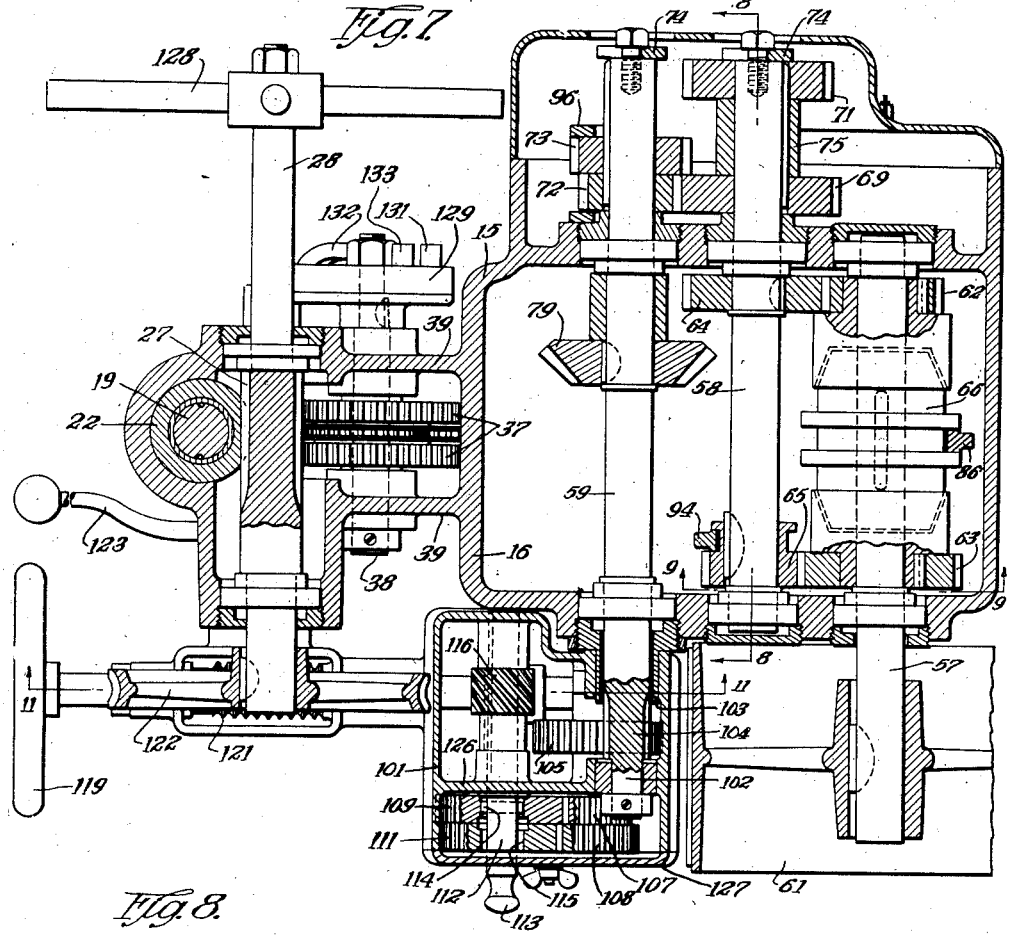

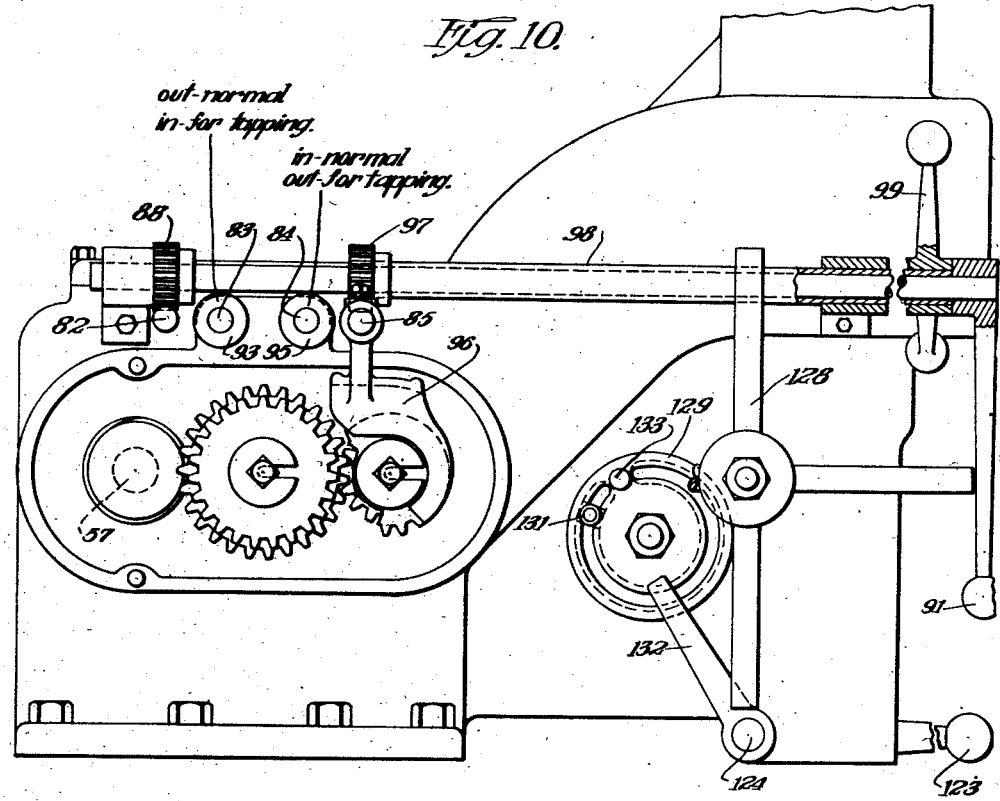
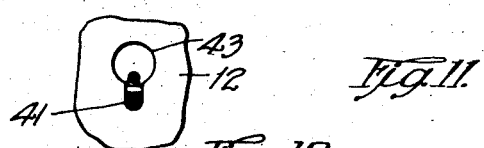
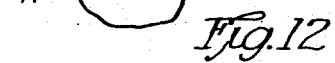
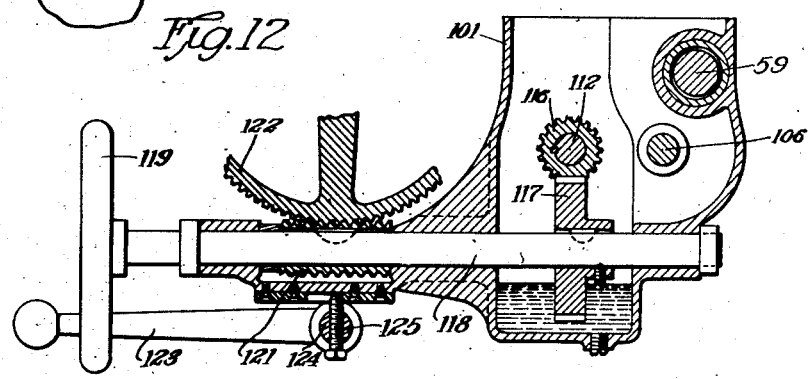

1,673,897

UNITED STATES PATENT OFFICE.

JOHN S. BARNES, OF ROCKFORD, ILLINOIS, ASSIGNOR TO W. F. & JOHN BARNES CO., OF ROCKFORD, ILLINOIS, A CORPORATION OF ILLINOIS.

DRILLING MACHINE.

Application filed November 15, 1923. Serial No. 674,810.

This invention pertains in general to machine tools such as employ a tool-carrying spindle adapted to be revolved at different cutting speeds and to be moved longitudinally at different feed and return speeds. While my invention in many respects is applicable to various types of machine tools, I have in the present instance embodied it in a machine especially adapted for drilling, reaming, tapping and similar operations.

One of the primary objects of my invention is to improve the cutting action of a tool spindle by mounting and driving the spindle in a novel manner. That is, I have aimed to produce a smooth continuous cutting action with the spindle in perfect alignment, without tool chatter, thereby obtaining greater accuracy and increased cutting capacity, as will be more apparent hereinafter. However, it will be here briefly noted that I journal the spindle in two spaced coaxial bearings in a rigid housing, and transmit rotary motion to the spindle at a point intermediate said bearings by means which, regardless of any eccentric relation or disalignment of the driving means and spindle as frequently exists in machine tools due to discrepancies in manufacture and for other reasons, imposes no lateral strains or deflection on the spindle. As a result, there is no tendency for the spindle to run out of true, and accurate alignment in drilling and similar operations is obtained. Furthermore, said driving means is so constructed as to effectually eliminate tool chattering or vibrations transmitted from gearing, thus producing a smooth, continuous cutting action, a factor in accurate cutting and also in increasing the quality of the work and capacity of the machine for heavy cutting.

I have also aimed to embody a spindle mounting and drive mechanism of the character described in a housing or frame constructed in such novel manner as to absorb all strains and prevent detrimental vibration and deflection in resisting the cutting thrust.

Another important object is to provide a simplified and exceptionally compact organization of spindle driving and feeding parts characterized by telescoping the non-rotary sleeve element of a spindle within an elongated gear hub which drives the spindle, and by closely associating with the spindle the means for driving said gear and for transmitting feed movement to the spindle.

Another object is to provide an improved means for counter-balancing a tool spindle.

Still another object is to provide an improved arrangement of gearing which is utilized for transmitting both rotary and longitudinal movement to the spindle and which affords a large variety of speed changes with comparatively few gears.

Other objects are to provide improved means for automatically stopping the spindle feed, to provide a simple manual control for such parts as require shifting at the will of the operator, to provide an improved oiling system, and to construct the machine in certain units so designed as to promote economy in the cost of production and to further certain of the objects mentioned above.

Other objects and attendant advantages will be appreciated by those skilled in the art as the invention becomes better understood by reference to the following description when considered in connection with the accompanying drawings, in which—

Figure 1 is a front elevation of a machine tool embodying my invention;

Fig. 2 is a side elevation of the machine with the column partly broken away;

Fig. 3 is a fragmentary section taken substantially on the line 3—3 of Fig. 2;

Fig. 4 is a vertical sectional view taken substantially on the line 4—4 of Fig. 1, enlarged, with the spindle parts in elevation:

Fig. 5 is a similar sectional view with the spindle parts in section;

Fig. 6 is a horizontal sectional view taken on the line 6—6 of Fig. 5;

Fig. 7 is a horizontal sectional view taken substantially on the line 7—7 of Fig. 4;

Figs. 8 and 9 are fragmentary, vertical sectional views taken substantially on the lines 8—8 and 9—9, respectively of Fig. 7;

Fig. 10 is a side elevation of the top end of the machine, enlarged, looking at the side opposite that shown in Fig. 2;

Fig. 11 is a fragmentary section taken substantially on the line 11—11 of Fig. 7; and Fig. 12 is a detail view mentioned hereinafter.

Referring more particularly to the drawings, it will be observed that I mount on a base 12 a hollow upright column 13 which is machined flat across its top 14 and has rigidly bolted thereto a head casting designated generally by 15. This head is shaped to provide a gear casing 16 directly above the column and a spindle housing overhanging the column. More particularly, the spindle housing comprises the lower section 17 and an upper section 18, the latter of which is in the form of a casting bolted to the head casting 15.

The spindle proper, designated generally by 19, best shown in Fig. 5, may be of any suitable or preferred construction, at present having a tapered socket 21 for the reception of a tool shank. The spindle revolves in a non-rotatable sleeve 22, being confined against endwise displacement with respect thereto by a roller thrust bearing 23 at the bottom of the sleeve and a thrust collar 24 threadingly engaged on the spindle above the sleeve, the usual fibre washer 25 being interposed between the collar and sleeve. The lower housing section 17 provides a long bearing 26 in which the sleeve 22 slides from end to end when reciprocated vertically.

The spindle is adapted to be moved vertically in feed and return movements by means of a spur pinion gear 27 fixed to a cross or feed shaft 28 journaled in the housing 17 near the upper end of the bearing 26, said gear meshing with a rack 29 cut in the sleeve 22. Novel means is employed, co-operating with the gear 27 for counter-balancing the weight of the tool spindle and tending to elevate the same. This means comprises a counter-balancing weight 31 suspended from a toothed member or gear 32 through the agency of a flexible connection 33 wound on said gear and fixed thereto at 34, said flexible connection or chain being run over a pulley 35, through an opening 36 in the top of the column, and under the gear 32 in a clockwise direction, the gear being grooved at 37 for the reception of and for guiding said chain. It will be observed that the gear 32 fixed to a shaft 38, is disposed in an opening between the spaced walls 39 which join the spindle housing and gear casing portions of the head casting 15, which opening communicates with the opening 36 in the top of the column, and that this arrangement of spindle counter-balancing parts at the under side of the head provides a most simple and direct construction for this purpose. Furthermore, by making the gear 32 of sufficiently larger diameter than the gear 27 the spindle will be moved the full length of its vertical travel in less than a complete revolution of the gear 32. The weight 31 is sufficient to raise the spindle, which will be elevated to its highest position when the weight is down. The downward movement of the weight and consequently the elevation of the spindle, is limited by a chain 41 passed through an eye 42 on the weight and at its ends through holes 43 in the sides of the column 13 and equipped outside of the latter with rings or the equivalent 44, these rings serving as stops as will be obvious, for limiting said downward movement of the weight. By drawing one end of the chain 41 outwardly so as to shorten the chain to the desired extent and catching one of the links of the chain in a restriction in its opening 43 (Fig. 12), the spindle will obviously be elevated to a less degree; and in this way the elevation of the spindle may be adjusted and determined.

Referring again to the mounting of the spindle, it will be observed that I have provided an upper bearing 45 in which the spindle is journaled to slide and rotate, this bearing being carried by a bracket 46 adjustably mounted on top of the upper housing section 18. When assembling the machine the bracket 46 is adjusted on the spindle housing to obtain absolute alignment of said upper bearing and the lower bearing 26, thus providing positively aligned and rigid bearings for the spindle.

In conjunction with a spindle mounting of this character, my invention contemplates the provision of novel means for driving, that is, transmitting rotary movement to the spindle for the cutting speed, with the view to imposing no lateral strains, binding or friction on the spindle such as might cause deflection of the latter, or in any way have a tendency to throw the spindle out of true alignment. In this regard, it will be noted that any construction whether due to its inherent design or to inaccuracies or discrepancies in the manufacture of the machines, which gives cause for any spindle deflection is objectionable as being inimical to absolute alignment of the spindle under all working conditions. Furthermore, my invention contemplates transmitting rotary movement to the spindle in such manner as to eliminate any tool chattering resulting from inaccuracies in gears, or any other cause. This is accomplished by transmitting such drive to the spindle at a point intermediate the bearings 26 and 45 through the agency of a rotary driving member embracing the spindle and journaled entirely independently thereof so as to be out of contact with the spindle except only for the driving contact. This driving contact is continuous, that is, by constant metal-to-metal contact, but transmits absolutely no lateral strains or pressure to the spindles other than torsional driving thrust. Consequently, even though the driving member be to a greater or less degree eccentric with respect to or out of alignment with the spindle, the latter will in no way be affected by such relation. To this end, I have in the present case provided a bevel driving gear 13

47 having an elongated hub 48 journaled on a sleeve 49 the lower end of which is pressed or otherwise fixedly secured in the spindle housing 17. The gear and its hub are suspended from the upper end of said sleeve through the agency of a ball thrust bearing 51. It will be noted that there is clearance between the bearing sleeve 49 and the spindle sleeve 22, as shown plainly in Fig. 5. Between the upper end of the elongated gear hub 48 and the spindle, I interpose a driving connection of the character above referred to, that is, one which transmits only torsional thrust. In the present embodiment of my invention this connection comprises a collar or head embracing the spindle with substantial clearance thereabout, and having diametrically opposed tongues 53 slidably fitting or seating in complemental grooves or seats 54 in the upper end of the gear hub 48. Driving connection between the head 52 and the spindle is established by diametrically opposed keys 55 at right angles to the tongues 54, said keys being fixed to the head 52 and disposed at their inner ends in key slots or grooves 56. It will be noted that the outside diameter of the head 52 is less than the inside diameter of the gear hub 48, and that substantial clearance is provided by the key grooves at the inner ends of the keys 55. It will be manifest from the foregoing that any disalignment of the spindle driving gear or its hub or of the driving connection itself which imparts rotary motion to the spindle, will in no way impose a strain on the spindle, but will instead, be absorbed in the transverse play afforded by the head 52 in its mounting on the gear hub or by similar play afforded between the keys 55 and the spindle. The result is that the spindle will at all times run in true alignment; there will be no lateral strains or pressures imposed on the spindle or its bearings by reason of eccentricity of the driving and driven parts; there will be no vibration transmitted through the driving connection and consequently to the cutting edge of the tool resulting in the so-called tool chatter or vibration; and the transmission of power to the cutting edge of the tool will be continuous and uniform, thereby increasing the life of the cutting edge, increasing accuracy of the drill or other tool being employed and increasing the cutting capacity of the tool.

Another advantage of the foregoing organization of parts is that the non-rotatable sleeve of the spindle telescopes substantially within the elongated spindle-driving gear hub. This gives a very compact arrangement and permits of the use of a relatively long spindle feed with a spindle housing of minimum length.

The mechanism for driving the spindle at different speeds will now be described, reference being had more particularly to Figs. 4 and 7 to 10 inclusive. Within the gear casing 16 I have mounted in a horizontal plane and extending crosswise of the machine, a driving shaft 57 and a first and a second intermediate shaft 58 and 59 respectively, all suitably journaled in the casing. The shaft 57 may be continuously driven by any suitable means, such for example as a driving pulley 61, fixed to an extended end of said shaft. The driving shaft has loose thereon a pair of spur gears 62 and 63 of different diameters which mesh respectively with gears 64 and 65 fixed on the first intermediate shaft 58, the gear 65 being splined on its shaft so as to be shiftable into and out of mesh with the gear 63 as will be presently described. A clutch is provided for connecting either of the gears 62 or 63 to the shaft 57, comprising in the present instance a shiftable element 66 having cone faced ends adapted to be frictionally connected to complemental friction faces fixed to said gears. The gears 62 and 63 transmit relatively low and high speeds respectively, to the shaft 58, depending on which gear is connected to the shaft 57 by the clutch element 66. A reversing gear 67 shown in Figs. 8 and 9, slidably mounted on a stub shaft 68, is adapted to be shifted into mesh with the gear 63, and the gear 65 is adapted to be withdrawn from the latter gear and shifted into mesh with the gear 67, thus reversing the drive to the shaft 58 when the gear 63 is engaged by the clutch 66. This rapid reverse is used for tapping operations as will be explained hereinafter. The shafts 58 and 59 are extended at one end beyond the side wall of the gear casing, providing support for change-speed gears 69 to 73 inclusive, making two pairs of complemental gears. These gears, splined on the respective shafts, are held against outward displacement therefrom by collars 74 which may be removed for transposing the gears. The gears 69 and 71 held in spaced relation by a collar 75, are adapted to be respectively engaged by the gears 72 and 73 which are shiftable on the shaft 59 so as to transmit either of two speeds from the shaft 58 to the shaft 59, or two additional speeds by transposing the gears. The shaft 59 is in constant driving connection with the spindle-driving gear 47 through the agency of an inclined shaft 76 journaled in suitable bearings in the gear casing and equipped at its upper end with a bevel gear 77 in mesh with the gear 47 and at its lower end with a bevel gear 78 in mesh with a complemental gear 79 fixed to the shaft 59. It will be noted that the bearing supports for the shaft 76 are formed integral with an inclined wall 81 reaching from the rear of the opening 36 in the top of the column 13, forwardly and upwardly substantially to the top of the gear casing and terminating just at the rear of the spindle mounting. This inclined wall confines the gear casing to a relatively small area, allows an opening between the gear casing and spindle mounting for the spindle counter-balancing means, provides rigid support for the shaft 76, and becomes an important factor in giving the necessary rigidity to the head for absorbing the thrust and resistance from the tool pressure. The foregoing construction enables an exceptionally compact arrangement of parts.

The control for the spindle speed will now be described. In the gear casing above the gearing there is mounted a plurality of transverse shifter rods 82 to 85 inclusive, these rods reaching beyond the gear casing at the side of the change-speed gearing and adapted to be operated from this side. The rod 82 carrying a fork 86 (Fig. 9) for shifting the clutch element 66, has a rack face 87 (Figs. 8 and 10) meshing with a gear 88 fixed to the shaft 89 journaled in suitable bearings on the side of the gear casing and reaching to the front of the machine. By means of a hand lever 91 fixed to said front end of the shaft 89, the clutch element 66 may be shifted for engaging the high and low speed gears or for tapping as will be presently described. The rod 83 carries a fork 92 (Figs. 8 and 9) for shifting the reversing gear 67 and is equipped at its outer end with a push-and-pull handle 93. The rod 84 carries a fork 94 for shifting the gear 65 and is equipped at its outer end with a push-and-pull handle 95. The rod 85 equipped at the outer side of the gear casing with a shifter fork 96 (Figs. 7 and 10) straddling the gears 72 and 73 and holding them in associated relation on the shaft 59, has a rack face meshing with a gear 97 fixed to a sleeve 98 supported and rotatable on the shaft 89 and having a handle 99 operable for shifting the change-speed gears. From the foregoing, it will be manifest that with the parts as shown in the drawings, the operator standing in front of the machine may throw the lever 91 to the left for the low spindle speed and to the right for the high speed, and that by swinging the lever 99 in a clockwise direction the gear 73 will be brought into mesh with the gear 71, thereby giving another ratio of high and low spindle speeds. In order to reverse the spindle drive as is desired in tapping operations, the handle 93 will be pushed in to engage the reversing gear 67 with the gear 63 and the handle 95 will be pulled out to withdraw the gear 65 from the gear 63 and move said gear 65 into mesh with the gear 67. Thus when the hand lever 91 is swung to the left, the spindle will be driven at the slow speed by the gears 62, 64 and following gears for the tapping speed, and when swung to the right the direction of the first intermediate shaft 58 will be reversed at a higher speed by the gears 63, 67 and 65 for backing out the tap.

The gearing for driving the spindles is also utilized for transmitting the spindle feed, except that additional gearing and driving mechanism is provided, which will be now described. Referring particularly to Figs. 7 and 11, it will be observed that the second intermediate shaft 59 is extended beyond the gear casing at its side opposite the change-speed gearing above described, and that a supplemental gear casing 101 is mounted on this extended end 102 of the shaft 59, said casing being also supported at its inner side on the outer end of a bearing retaining nut 103 and being adapted to swing on its support for connecting and disconnecting the spindle feed as will be presently described. Said extended end 102 of the second intermediate shaft has gear teeth 104 cut therein meshing with a gear 105 fixed to a shaft 106. The shaft 106 carries a pair of fixed gears 107 and 108 meshing respectively with gears 109 and 111 loose on a shaft 112, which with the shaft 106 is journaled in the casing 101. The shaft 112 may be moved lengthwise by means of its handle end 113 for moving its diametrical projections 114 into and out of connection with complemental key slots 115 in the gears 109 and 111 for thereby connecting either of said gears to said shaft. Said shaft 112 has splined thereon a spiral gear 116 in mesh with a spiral gear 117 fixed to a shaft 118 at right angles to the shaft 112 and reaching to the front of the machine. This shaft 118 journaled in suitable bearings in the gear casing 101, is equipped at its forward end with a hand wheel 119 and intermediate its ends with a worm 121 adapted to be moved into and out of mesh with a worm wheel 122 fixed to the spindle feed shaft 28; and to this end the gear casing 101 is adapted to be rocked on its bearing support by operation of a hand lever 123. Said lever 123 is fixed to a shaft 124 journaled in the lower end of the spindle housing, which shaft carries a screw 125 adapted to engage the underside of the gear casing 101 when the shaft 124 is swung in a clockwise direction viewing Fig. 11, for raising the worm 121 into mesh with the worm wheel 122 and to unmesh said worm when swung in the opposite direction, suitable stops being provided for limiting the rocking movement of the shaft 124. It will be evident that when the worm 121 is engaged with the worm wheel, power from the shaft 59 will be transmitted to the spindle sleeve 22 through the various reducing gears, thus imparting feed movement to the spindle. Inasmuch as the spindle feed is transmitted directly from the shaft 59 it will be directly proportional to the speed of the spindle. Variations in feed may, however, be obtained by means of the change-speed gears 109 and 111 and by substituting additional gears for this group. When the machine is set for tapping, it will be manifest that the spindle will be fed downwardly at a slow speed and retracted at a higher speed, the rotation of the spindle being reversed simultaneously with withdrawing the spindle for backing out the tap or other tool. It will be noted that the gear casing 101 is divided by a partition 126 so as to provide an oil-tight compartment for the spiral gears, and that access is had to the change-speed gears by removing the side plate 127. In addition to the power spindle feed I have provided a hand feed which is operable when the worm gear 121 is out of mesh, this consisting in the usual hand wheel 128 fixed to the spindle feed shaft 28.

My invention also contemplates the provision of a simple and novel means for automatically stopping the spindle feed at a predetermined point. This comprises a disk 129 fixed to the shaft 38 (Figs. 7 and 10) and equipped with a circumferentially adjustable stop element 131 adapted to actuate a lever 132 fixed to the shaft 124 for unmeshing the worm 121. As the spindle feeds down the disk 129 will turn in a counterclockwise direction viewing Fig. 10, and the stop element 131 will strike the lever 132, thereby moving it in a clockwise direction and unmeshing said worm. In the event that the stop element 131 is improperly adjusted or omitted, the spindle feed will be stopped by a stationary element 133 on said disk striking the lever 132 before the spindle rack runs off its gear 27. Thus it will be seen that the spindle movement in both directions is positively and automatically controlled, the feed movement by the adjustable stop device just described, and the return movement by the counterbalancing means above described.

Another feature of my invention consists in so organizing and constructing the parts that they will be self-lubricated by a system which will now be described. The gear casing 16 provides an oil reservoir in the cover 134 of which is a breather opening 135. The gears in said casing dip or run in the oil contained therein and splash or churn the oil so that all the gears and their shaft bearings in this casing are lubricated. On the periphery of the gear hub 48, I have provided a spiral rib 136 which when the machine is in operation creates an upward current of air through the spindle housing, said current being admitted through the breather opening 135 and discharging through the outlet opening 137 in the top of the spindle housing. This air carries with it all the oil vapor from the gear casing 16 which deposits on the shaft 76, lubricating gears 77 and 47 and the gear hub 48 and other parts exposed within the spindle housing. The oil accumulating on the gear hub 48 runs down the rib and through openings 138 in said hub (Fig. 5) for lubricating interior parts such as the bearing between said hub and the part 49, the roller bearing 51, the spindle bearing in its sleeve 22, the bearings 23 and 26, and the gears 28 and 32. The upper spindle bearing 45 may be oiled separately from the top. The parts in the supplemental gear casing 101 will be lubricated as above described.

Any suitable work support may be employed, that shown comprising a table 139 vertically adjustable upon ways 141 on the front of the column 13.

It is believed that from the foregoing description the operation of the machine will be apparent to those skilled in this art. In view of the particular design of the machine it is especially adapted for drilling, reaming, tapping and like operations. However, my invention in its broader aspect is not limited to this particular type of machine tool, but might be embodied in other types, especially as to certain features as will be apparent from the claims. In the present design I have aimed to assemble the operating parts in units, with the view to lowering the cost of production, and at the same time obtaining a simple and thoroughly practical and durable construction. The principal unit is the head casting 15 and parts journaled thereon. Aside from machining the top and bottom face of this casting, practically all of the remaining machining operations, such as drilling, reaming and tapping may be done with the casting held in a single fixture. Furthermore, practically all of the working parts may be assembled directly on this unit, an additional factor in reducing the cost of manufacture. The supplemental gear casing 101 and parts carried thereby make up another unit of assembly.

It is believed that the foregoing conveys a clear understanding of the objects prefaced above, and while as already mentioned, I have illustrated but a single working embodiment, it should be understood that my improvements are of wide application to machine tools, and various changes may be made in details of construction without departing from the spirit and scope of the invention as expressed in the appended claims, in which—

I claim:

1. In a machine tool, the combination of two spaced coaxial bearings in rigid relative relation, a sleeve mounted for reciprocation in one of said bearings, a tool spindle journaled in said sleeve and held against axial translation with respect thereto and being journaled for rotation and reciprocation in the other of said bearings, means for moving the sleeve lengthwise for imparting feed movement to the spindle, and means for imparting rotative movement to the spindle including a driving member embracing the spindle intermediate said bearings and journaled independently of and out of contact with the spindle and having driving contact with the spindle such as will transmit only rotative pressure thereto regardless of any eccentricity in the relative relation of said driving member and spindle.

2. In a machine tool, the combination set forth in claim 1, in which said spindle driving member is in the form of a gear having an elongated hub and in which the driving connection between said hub and the spindle is through the agency of a collar having diametrically opposed tongues slidably seating in said hub and diametrically opposed keys fitting in key-ways in the spindle and having capacity for play in the diametrical plane of the keys.

3. In a machine tool, the combination set forth in claim 1, in which said spindle driving member is in the form of a gear having an elongated hub and in which the driving connection between said hub and the spindle is through the agency of diametrically opposed keys fitting in key-ways in the spindle and having capacity for play in the diametrical plane of the keys, and including a stationary bearing sleeve interposed between the spindle sleeve and the gear hub, said bearing sleeve providing a bearing on which the gear hub is journaled and being out of contact with the spindle sleeve.

4. In a machine tool, the combination of two spaced coaxial bearings in rigid relative relation, a spindle housing rigidly joining said bearings, a sleeve mounted for reciprocation in one of said bearings, a tool spindle mounted at one end for rotation in said sleeve but fixed against longitudinal movement relatively thereto and mounted at its other end for rotation and reciprocation in the other bearing, a gear within the spindle housing embracing the spindle and having a relatively long hub within which the spindle sleeve is adapted to telescope, the gear being journaled independently of and out of contact with the spindle and its sleeve, and a driving connection between said gear hub and the spindle which will not impose lateral pressure on the spindle in the event of disalignment of said gear hub and spindle.

5. In a machine tool of the character described, the combination of an upright column, a gear casing fixed to the top of said column and having a spindle housing overhanging the column, a tool spindle in said housing, a non-rotatable sleeve in which the spindle is journaled and for reciprocating the spindle, a spindle feed shaft having geared connection with said sleeve for reciprocating it, a bevel gear embracing the spindle and having an elongated hub journaled in the housing independently of the spindle above said feed shaft, said hub having a driving connection with the spindle, gearing in said gear casing below the level of said spindle driving bevel gear, and an inclined shaft connecting said gearing with said bevel gear.

6. A machine tool of the character set forth in claim 5, in which said gear casing is formed of an upper and a lower section, the lower section having a bearing below the spindle shaft in which the spindle sleeve is mounted for reciprocation and the upper section having a bearing above said elongated gear hub in which the spindle is journaled.

7. A machine tool of the character described, comprising an upright column, a gear casing on the upper portion of the column, a spindle housing forward of said casing overhanging the column, a tool spindle in said housing, gearing in said casing, a driving train from said gearing to the spindle for imparting rotary motion thereto, a spindle counter-balancing weight in the column, and a connection between the weight and spindle including a cross-shaft for imparting feed movement to the spindle, a member geared to said cross-shaft and a flexible connection for suspending the weight from said member, said spindle counter-balancing parts being all located beneath said driving train.

8. In a machine tool of the character described, the combination of an upright column, a head rigidly secured to the top of said column, the head having formed integrally therewith a spindle housing overhanging the column and a gear casing directly above the column, said gear casing having a front wall inclined upwardly and forwardly reaching from the top of the column to the top of the spindle housing, a vertically reciprocable spindle in said housing, gearing in said gear casing for driving the spindle, a spindle counter-balancing weight in the column, and means disposed in the head between the spindle housing and said inclined wall and connecting said spindle and weight so that the latter tends to elevate the former.

9. In a machine tool of the character described, the combination set forth in claim 8, in which said means includes a rotary element geared in connection with the spindle, and a flexible connection wound on said geared element and suspending the weight.

10. In a machine tool of the character described, the combination of an upright column having an opening in its top, a gear casing mounted on the top of said column and having an overhanging spindle housing, a tool spindle mounted for vertical reciprocation in said housing, gearing in the casing for driving the spindle, the casing intermediate its gear-carrying portion and the spindle-carrying portion having an opening communicating with said opening in the top of the column, a member mounted in said casing opening and being in geared connection with the spindle, a weight in the column, and a connection for suspending said weight reaching through said top opening and casing opening and attached to said geared member for counter-balancing the spindle.

11. In a machine tool of the character described, the combination of an upright column, a spindle housing thereon, a tool spindle, a non-rotatable sleeve in which the spindle rotates and which is vertically reciprocable in the housing, a rack on said sleeve, a spindle feed pinion meshing with said rack, a second gear meshing with said pinion, and a spindle counter-balancing weight in the column suspended by means wound on said second gear so that the weight tends to elevate the spindle.

12. In a machine tool of the character described, the combination of a tool spindle, a non-rotatable vertically reciprocable sleeve in which the spindle rotates, a rack on said sleeve, a feed pinion meshing with said rack, a gear meshing with said pinion, a counter-balancing weight suspended by means connected with said gear so that the weight tends to elevate the spindle, and adjustable means for limiting the lowering movement of the weight and consequently the elevating movement of the spindle.

13. A machine tool of the character described, comprising a column, the head of which provides a gear casing and has an overhanging spindle housing, a tool spindle in said housing, a non-rotatable sleeve concentric with the tool spindle, a cross-shaft having a gear meshing with a rack on the sleeve for imparting vertical movement to the spindle, a spindle counter-balancing weight in the column, means suspending the weight and geared to said cross-shaft whereby the weight tends to elevate the spindle, a spindle-driving gear concentric with the spindle journaled in the housing above said cross-shaft and having an elongated hub within which said sleeve is adapted to telescope, gearing in said casing below the level of said spindle-driving gear, and an inclined shaft within the casing geared at its ends to said spindle-driving gear and said gearing.

14. A machine tool of the character described comprising a column, the head of which provides a gear casing and has an overhanging spindle housing, a spindle vertically reciprocable in the housing, a horizontal driving shaft in said casing, a horizontal first and a second intermediate shaft in said casing, a pair of gears of different diameters loose on the driving shaft, a clutch for connecting either of said gears to the driving shaft, gears fixed to the first intermediate shaft and in mesh with said gears on the driving shaft, a bevel gear fixed to the second intermediate shaft, a bevel gear concentric with the tool spindle for driving it, and a shaft equipped at each end with a bevel gear, one of said bevel gears being in mesh with the bevel gear on the second intermediate shaft and the other with the bevel gear on the spindle.

15. A machine tool as set forth in claim 14 in which the end of the second intermediate shaft remote from its change-speed gear and extends beyond the housing, and change-speed gearing driven by the latter extended end of the second intermediate shaft and connected with the spindle for imparting vertical feed movement thereto.

16. A machine tool as set forth in claim 14 in which the first and second intermediate shafts are extended at one end beyond the casing and equipped on their extended ends with change-speed gearing.

17. A machine tool as set forth in claim 14, in which the first and second intermediate shafts are extended at one end beyond the casing, a pair of gears of different diameters fixed to one of said extended shaft ends, and a pair of gears splined on the other shaft end respectively complemental to and shiftable into and out of mesh with the respective gears of said pair on the other extended shaft end.

18. In a machine tool of the character described, the combination of a spindle housing, a tool spindle therein, a gear casing, change-speed gearing therein including a driven shaft for transmitting rotary motion to the spindle, a cross-shaft in said housing for transmitting longitudinal feed movement to the spindle, a worm wheel on said cross-shaft, said driven shaft extending from one side of the gear casing, a supplemental gear casing supported to swing about the axis of said extended shaft end, change-speed gearing in said supplemental casing driven by a gear on said shaft end, and a worm driven by the last mentioned gearing adapted to be moved into and out of mesh with said worm wheel by said movement of the supplemental casing.

19. A machine tool as set forth in claim 18, in which said supplemental gear casing is supported in part on said extended shaft end.

20. A machine tool as set forth in claim 18, including means for moving said casing for meshing and unmeshing said worm gears, and a feed stop device adapted for operating the last-named means for unmeshing the worm gear at a predetermined point in the feed of the spindle.

21. In a machine tool, the combination of a tool spindle, a driving shaft, a first and a second intermediate shaft, a pair of gears of different diameters loose on the driving shaft and in mesh with gears fixed on the first intermediate shaft, one of which latter gears is shiftable, a reversing gear adapted to mesh with said shiftable gear in its shifted position and to mesh with the gear on the driving shaft complemental to said shiftable gear, change-speed gears connecting said intermediate shafts, gearing connecting the second intermediate shaft and the spindle for transmitting rotary motion to the latter, and reduction gearing including change-speed gears driven by said second intermediate shaft for transmitting longitudinal feed movement to the spindle.

22. In a machine tool, the combination of a tool spindle, means for revolving the spindle, a cross-shaft having a gear meshing with a rack connected with the spindle for imparting longitudinal feed movement thereto, a rotary member geared to said cross-shaft gear, spindle counterbalancing means exerting a pressure on said rotary member tending to elevate the spindle, driving means for revolving the cross-shaft, a rotary member fixed with the first mentioned rotary member and carrying a circumferentially adjustable stop element, and means adapted to be actuated by said stop element for disconnecting said driving means from the cross-shaft.

23. In an upright drilling machine, in combination, an upright column having an overhanging spindle support, a vertical spindle mounted for rotation and vertical feed in said support, a gear co-axial with the spindle for rotating it, an oil containing gear casing on the column below said gear, change-speed gearing in said casing mounted on spaced horizontal driving and driven shafts, the gears of which dip in the oil, and an inclined shaft on the column having a gear at its lower end in mesh with a gear on said driven shaft and a gear at its upper end in mesh with the said spindle driving gear.

24. In an upright drilling machine, in combination, a vertical spindle, a gear co-axial with the spindle for rotating it, a gear casing, a driving and a driven shaft in said casing, a pair of gears of different diameter loose on the driving shaft, a clutch for connecting either of said gears to the driving shaft, a pair of gears fixed on the driven shaft and in mesh with said gears on the driving shaft, one of the gears on the driven shaft being shiftable out of mesh with its complemental gear on the driving shaft, a reversing gear adapted to connect said shiftable gear and its said complemental gear, and a gearing connection between said driving shaft and the said spindle driving gear.

25. In an upright drilling machine, in combination, a vertical spindle, a gear co-axial with the spindle for rotating it, a gear casing, a driving and a driven shaft in said casing, a pair of gears of different diameter loose on the driving shaft, a clutch for connecting either of said gears to the driving shaft, a pair of gears fixed on the driven shaft and in mesh with said gears on the driving shaft, one of the gears on the driven shaft being shiftable out of mesh with its complemental gear on the driving shaft, a reversing gear adapted to connect said shiftable gear and its said complemental gear on the driving shaft, a second driven shaft in said casing, change-speed gears between said driven shafts, and a gearing connection between the second driven shaft and the said spindle driving gear.

JOHN S. BARNES.